A. R. BARNETT.
KNIFE.
APPLICATION FILED JULY 21, 1913.
1,124,690. Patented Jan. 12, 1915.
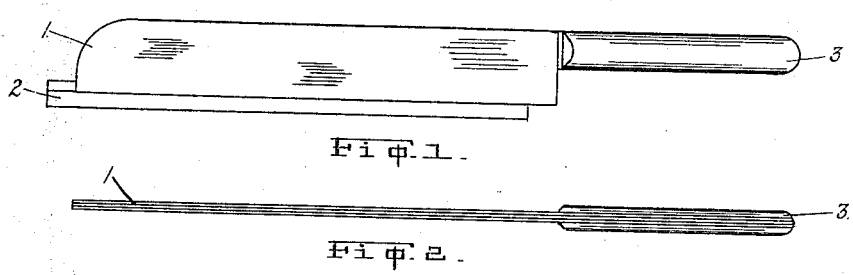
Fig. 1.
Fig. 2.
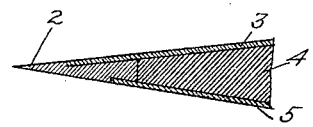
Fig. 3.
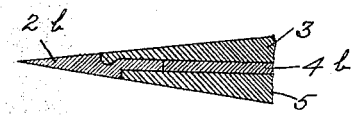
Fig. 4.
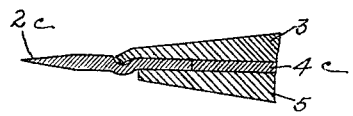
Fig. 5.
WITNESSES:
Karl S. Brown
H. A. Armstrong
INVENTOR.
Arthur R. Barnett
BY
ATTORNEY.

UNITED STATES PATENT OFFICE.

ARTHUR R. BARNETT, OF PORTLAND, OREGON, ASSIGNOR TO BARNETT'S INCORPORATED.

KNIFE.

1,124,690.      Specification of Letters Patent.      Patented Jan. 12, 1915.

Application filed July 21, 1913. Serial No. 780,234.

*To all whom it may concern:*

Be it known that I, ARTHUR R. BARNETT, a citizen of the United States of America, residing at Portland, in the county of Multnomah and State of Oregon, have invented certain new and useful Improvements in Knives, of which the following is a specification.

My invention relates to knives, and more particularly to that class of knives known as butcher knives, carving knives, and the like, which have long sharp blades with a fixed handle.

The principal object of my invention is to provide a knife of such character with a detachable and interchangeable cutting blade, whereby a cutting blade of high grade steel can be detachably secured to a knife blade body, thus making it possible to have several cutting blades for use with a single blade body and handle.

In order that others may clearly understand my invention, I have illustrated it in the accompanying sheet of drawings, with slightly modified forms thereof, which I will now describe.

In the drawings, Figure 1 is a side elevation of a knife embodying my invention, and showing a detachable cutting blade partially removed longitudinally from the blade body; Fig. 2 is an edge view thereof; Fig. 3 is an exaggerated cross sectional view through the blade body and blade, showing the general construction and arrangement thereof; Fig. 4 is a similar view of a slightly modified form thereof; Fig. 5 is a similar view of a slightly different form of the invention.

In the embodiments of the invention shown in the drawings for illustrative purposes, I have provided a knife blade body 1, with a detachable cutting blade 2, and a handle 3. The blade body 1 is preferably composed of two metal sides set at an angle to each other, with a spacing or filling member 4 therebetween. Said metal sides approach each other at their lower edges, projecting slightly beyond the lower edge of the spacing or filling member 4, whereby to provide a receiving socket, extending longitudinally of the blade body, to receive the cutting blade 2 said blade body being formed of resilient material. Said cutting blade is of wedge shape in cross section, and has its opposite sides, along its back portion, cut away to form receiving seats on opposite sides thereof to receive the edges of the blade body 1, so that when said cutting blade is inserted into said receiving socket, longitudinally between the members of the blade body, its opposite sides are flush and smooth with the meeting edges of the blade members, thereby providing a smooth, flush joint between the cutting blade and the blade body. The members of said blade body can be firmly secured together upon the spacing or filling strip in any desired and suitable manner, preferably so that the lower edges thereof must be slightly sprung or flexed apart to receive the cutting blade therebetween.

In Fig. 3, the construction shows that the sides of the blade body are of different widths, thereby requiring that the receiving seats in the sides of the cutting blade be of different extent, from the edge, as clearly indicated in said figure.

In Figs. 4 and 5, the construction is very much the same, except that the receiving seats in the sides of the detachable cutting blades are differently formed, requiring differently formed clamping edges for the members of the blade body, as clearly illustrated in the enlarged cross sectional views.

In all forms of the invention, it is preferably desired that the cutting blade 2 have a direct bearing, not only against the edges of the blade body members, but also at its inner edge against the spacing or filling member 4, thereby giving a firm seat bearing between the blade body 1 and the cutting blade 2.

I am aware that other modifications can be made without departing from the spirit of the invention, and I do not, therefore, limit the invention to the particular form here shown, except as I may be limited by the hereto appended claims, forming a part hereof. It is obvious that the spacing member 4 may be made integral with one of the side members.

I claim:

1. A knife comprising in combination a blade body composed of two spaced members formed of resilient material and inclining toward each other, the free edge of one extending beyond that of the other, a handle therefor, and a cutting blade having in each face an inwardly inclined longitudinal recess adapted to receive the corresponding member of the blade body to form a continuous face flush with that of said blade, whereby the blade may be retained in position by frictional contact between said members.

2. In a knife of the character referred to, a blade body comprising spaced side members formed of resilient material and inclining toward each other with a spacing member therebetween and having their lower edges extending unequally beyond said spacing member to form a longitudinally extending receiving socket between said edges, a handle therefor, and a cutting blade having inwardly inclined longitudinally extending receiving seats formed in its opposite sides and adapted to receive the corresponding edges of said side members when said cutting blade is inserted longitudinally and edgewise therebetween, substantially as and for the purpose described.

Signed at Portland, Oregon, this 16 day of July, 1913.

ARTHUR R. BARNETT.

In presence of—
 KARL S. BROWN,
 E. EARL FEIKE.

Copies of this patent may be obtained for five cents each, by addressing the "Commissioner of Patents, Washington, D. C."